UNITED STATES PATENT OFFICE.

ARTHUR MUTSCHELLER, OF NEW YORK, N. Y.

METHOD USED AND MATERIAL EMPLOYED IN THE MANUFACTURE OF X-RAY OR RÖNTGEN PLATES, FILMS, OR PAPERS.

1,315,324.      Specification of Letters Patent.      Patented Sept. 9, 1919.

No Drawing.      Application filed August 23, 1915. Serial No. 46,923.

*To all whom it may concern:*

Be it known that I, ARTHUR MUTSCHELLER, a citizen of the United States, residing at Number 332 East Eighty-third street, in the borough of Manhattan, city of New York, in the county and State of New York, have invented new and useful Improvements in Methods Used and Materials Employed in the Manufacture of X-ray or Röntgen Plates, Films, or Papers, of which the following is a specification.

The invention relates to the process of imparting to such plates, films or papers increased sensitiveness toward X-rays or Röntgen rays or cathode rays or any other rays of shorter wave-length than visible rays. This has hitherto been effected by means of fluorescent, or so-called intensifying screens placed in contact with the pellicle of the X-ray plate, film or paper.

Instead of relying upon these intensifying screens, I incorporate into the emulsion constituting the pellicle a suitable substance or mixture which is either pentadecyl-p-tolyl ketone, or acridin-hydrochlorid, or anthracene derivatives, such as dichlor-anthracene 2-7 disodium sulfonate and dimethyl-anthracene soluble salts, or phenanthrene, similar derivatives, etc., or any other soluble or transparent substance or mixture which will not interreact chemically with the emulsion or film (pellicle) and which, when exposed to X-rays or Röntgen rays or cathode rays or the like, after incorporation, produces a chemically active fluorescence.

It will be noted that, as the product of the method above set forth, I have a sensitized photographic material containing a substance which will not react chemically with the sensitized material, but which on exposure of the sensitized material to rays of shorter wave length than the visible rays will produce a chemically active fluorescence.

The foregoing method obviates the necessity and cost of intensifying-screens and does away with their inherent disadvantages, such as their large grain, their imperfect contact with the plate, film or paper and their quality of picturing dust particles and scratches usually present on such screens. Moreover, by the incorporation of any substance or mixture above described, the chemical action of the fluorescence is greatly increased owing to the closer contact of such substance or mixture with the particles of the emulsion. The maximum ripening process which has hitherto impaired the fineness and keeping qualities of the emulsion is, therefore, rendered unnecessary.

I claim—

1. The process of increasing the sensitiveness of sensitized materials to rays of shorter wave length than the visible rays, which process consists in incorporating with such sensitized materials a soluble transparent substance, which, on exposure to such rays, will produce a chemically active fluorescence and which substance will not react chemically with such sensitized materials.

2. The process of increasing the sensitiveness or sensitized materials to rays of shorter wave length than the visible rays, which process consists in incorporating with such sensitized materials a transparent substance, which, on exposure to such rays, will produce a chemically active fluorescence and which substance will not react chemically with such sensitized materials.

3. The process of increasing the sensitiveness of sensitized materials to rays of shorter wave length than the visible rays, which process consists in incorporating with such sensitized materials a soluble substance which, on exposure to such rays, will produce a chemically active fluorescence and which substance will not react chemically with such sensitized materials.

4. The process of increasing the sensitiveness of sensitized materials to rays of shorter wave length than the visible rays, which process consists in incorporating with such sensitized materials a substance which, on exposure to such rays, will produce a chemically active fluorescence and which substance will not react chemically with such sensitized materials.

5. The product, herein described consisting of a sensitized photographic material containing a soluble transparent substance, which will not react chemically with the sensitized material, but which on exposure to rays of shorter wave length than the visible rays, will produce a chemically active fluorescence.

6. The product, herein described consisting of a sensitized photographic material containing a soluble substance, which will not react chemically with the sensitized material, but which on exposure to rays of shorter wave length than the visible rays will produce a chemically active fluorescence.

7. The product herein described consisting of a sensitized photographic material containing a transparent substance, which will not react chemically with the sensitized material, but which on exposure to rays of shorter wave length than the visible rays, will produce a chemically active fluorescence.

8. The product herein described consisting of a sensitized photographic material containing a substance which will not react chemically with the sensitized material, but which on exposure to rays of shorter wave length than the visible rays, will produce a chemically active fluorescence.

In testimony whereof I have hereunto set my hand, in presence of two witnesses, on the eighth day of July, A. D. one thousand nine hundred fifteen.

ARTHUR MUTSCHELLER.

Witnesses:
  CARL ROSE,
  WILLIAM JOHANNING.